United States Patent
Oberlin et al.

(10) Patent No.: US 10,766,145 B2
(45) Date of Patent: Sep. 8, 2020

(54) EYE IN-HAND ROBOT

(71) Applicant: Brown University, Providence, RI (US)

(72) Inventors: John Oberlin, Providence, RI (US); Stefanie Tellex, Cambridge, MA (US)

(73) Assignee: Brown University, Providence, RI (US)

(*) Notice: Subject to any disclaimer, the term of this patent is extended or adjusted under 35 U.S.C. 154(b) by 327 days.

(21) Appl. No.: 15/953,022

(22) Filed: Apr. 13, 2018

(65) Prior Publication Data
US 2018/0297215 A1    Oct. 18, 2018

Related U.S. Application Data

(60) Provisional application No. 62/485,575, filed on Apr. 14, 2017.

(51) Int. Cl.
*B25J 15/00* (2006.01)
*B25J 19/04* (2006.01)
*B25J 9/16* (2006.01)
*B25J 19/02* (2006.01)

(52) U.S. Cl.
CPC ......... *B25J 15/0004* (2013.01); *B25J 9/1607* (2013.01); *B25J 9/1612* (2013.01); *B25J 9/1697* (2013.01); *B25J 15/0028* (2013.01); *B25J 19/023* (2013.01); *B25J 19/04* (2013.01); *G05B 2219/40543* (2013.01); *G05B 2219/40613* (2013.01)

(58) Field of Classification Search
CPC .. B25J 15/0004; B25J 15/0028; B25J 19/023; B25J 19/04; B25J 9/1607; B25J 9/1612; B25J 9/1697; G05B 2219/40543; G05B 2219/40613
See application file for complete search history.

(56) References Cited

U.S. PATENT DOCUMENTS

| | | | | |
|---|---|---|---|---|
| 6,167,607 B1* | 1/2001 | Pryor | ................... | A01B 69/008 29/407.04 |
| 6,639,594 B2* | 10/2003 | Zhang | ................... | G06T 15/506 345/426 |
| 8,773,508 B2* | 7/2014 | Daniel | ................... | G06T 7/55 348/42 |
| 9,517,563 B2* | 12/2016 | Watanabe | ............... | B25J 9/1607 |
| 10,365,554 B1* | 7/2019 | McDowall | ............ | H04N 13/218 |
| 2006/0008136 A1* | 1/2006 | Leroux | ................... | B25J 9/1697 382/153 |

(Continued)

OTHER PUBLICATIONS

"Grasping Novel Objects with Depth Segmentation". Rao et al. IEEE/RSJ International Conference on Intelligent Robots and Systems. 2010 (Year: 2010).*

*Primary Examiner* — Nicholas Kiswanto
(74) *Attorney, Agent, or Firm* — Adler Pollock & Sheehan P.C.

(57) ABSTRACT

A robot includes a gripping member configured to move and pick up the object, a camera affixed to the gripping member such that movement of the gripping member causes movement of the camera, the camera configured to measure and store data related to intensity of light and direction of light rays within the environment, an image processing module configured to process the data to generate a probabilistic model defining a location of the object within the environment, and an operation module configured to move the gripping member to the location and pick up the object.

13 Claims, 6 Drawing Sheets

(56) References Cited

U.S. PATENT DOCUMENTS

2015/0258684 A1* 9/2015 Harada ................. B25J 9/1612
                                                                           700/259
2019/0061159 A1* 2/2019 Domae ................... B25J 19/06

* cited by examiner

US 10,766,145 B2

EYE IN-HAND ROBOT

CROSS REFERENCE TO RELATED APPLICATIONS

This application claims benefit from U.S. Provisional Patent Application Ser. No. 62/485,575, filed Apr. 14, 2017, which is incorporated by reference in its entirety.

STATEMENT REGARDING GOVERNMENT INTEREST

None.

BACKGROUND OF THE INVENTION

The invention generally relates to robotics, and more specifically to an eye in-hand robot.

Many tasks require a robot to detect and manipulate shiny and transparent objects, such as washing glasses and silverware in a sink full of running water, or assisting a surgeon by picking a metal tool from a metal tray. However existing approaches to object detection struggle with these so called "non-Lambertian objects" because the shiny reflections create vivid colors and gradients that change dramatically with camera position, fooling methods that are based on only a single camera image.

Because it can move its camera, a robot can obtain new views of the object, increasing robustness and avoiding difficulties in any single view. To benefit from this technique, the robot must integrate information across multiple observations. One approach is to use feature-based methods on individual images, but this approach does not incorporate information about the viewing angle and can still struggle with non-Lambertian objects. Other approaches create three dimensional (3D) meshes from multiple views but do not work well non-Lambertian objects, which are still considered an open problem.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a robot including a gripping member configured to move and pick up the object, a camera affixed to the gripping member such that movement of the gripping member causes movement of the camera, the camera configured to measure and store data related to intensity of light and direction of light rays within the environment, an image processing module configured to process the data to generate a probabilistic model defining a location of the object within the environment, and an operation module configured to move the gripping member to the location and pick up the object.

In another aspect, the invention features a method including moving a camera between a plurality of locations, each location generating a different viewing angle between the camera and the object, measuring data, with respect to the object and the environment, showing intensity of light and direction of light rays in the environment at each location, processing the data to determine a most likely location of the object, and operating a gripper on the robot by moving the gripper to the most likely location and picking up the object with the gripper.

Embodiments of the invention may have one or more of the following advantages.

Light field photography, or plenoptic photography, provides powerful avenues of inference for robotic perception because it incorporates information from the intensity as well as the angle of the light rays, information which is readily available from a calibrated camera that can collect multiple views of a scene. Light fields naturally capture phenomena such as parallax, specular reflections, and refraction by scene elements.

A probabilistic model is presented with and associated methods for turning a calibrated eye-in-hand camera into a time-lapse light field camera that can be used for robotic perception.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
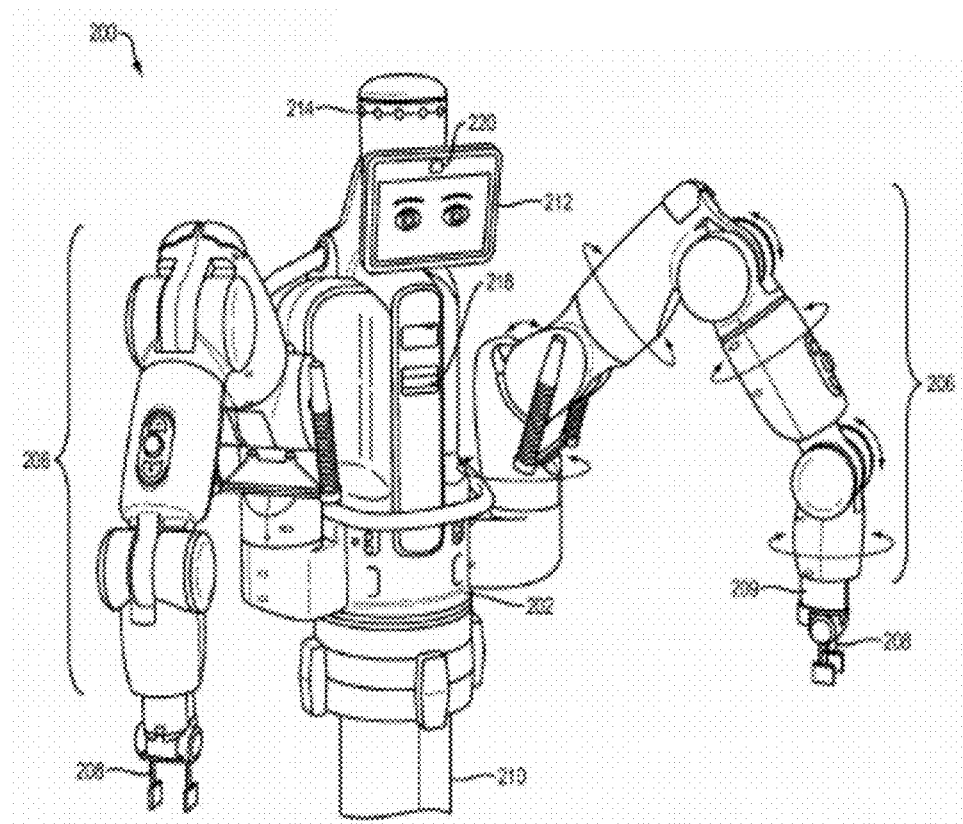
FIG. 1 illustrates an exemplary robot.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates an exemplary robot 200, also referred to herein as "Baxter." The robot 200 has a humanoid appearance in that it includes a body (or torso), head 204, and two arms 206 with grippers 208 attached at their ends. Each arm includes seven links and a wrist 209 at its distal end. The links are connected to each other and the robot body 202 via seven joints that collectively provide seven degrees of freedom for the motion of the arm 206. Each joint either provides a hinge that allows an angle to vary between two links (i.e., allowing the links to rotate around an axis through the joint that is perpendicular to the axes of the links), or facilitates rotation of the more distal link around its axis. The robot 200 generally operates in force-control mode. In force-control mode, actuators apply specified forces to the joints. While the forces may be calculated to cause movement of the arm(s) to certain spatial locations and/or along certain trajectories, the planned motion will generally be interrupted when the robot experiences unexpected external forces. Thus, force-control mode enables, e.g., a collision detection behavior executed on the robot to halt motion in case of forces resulting from unexpected collisions. In the exemplary robot 200, series elastic actuators (SEAs) in the joints serve to apply forces as directed by joint-level controllers, as well as to measure the forces at the joints for feedback control, collision detection, and to estimate any force applied to the wrist 209 of the arm 206 externally (e.g., by a user).

The robot's grippers 208 may be any end-effector(s) suited to robot operation in a particular application. In some embodiments they are mechanical grippers, e.g., each including two or more fingers extending parallel to each other from the wrist 209 and having a variable, mechanically adjustable distance from each other.

The robot body 202 is mounted on a base 210, which may be fixed, rollable, or otherwise movable, depending on the needs of the particular application and environment in which the robot 200 is used. The vertical position of the robot's body 202 may be adjustable via different heights of the base 210.

The robot's user interface may be wholly or partially embedded in the robot's body 202, head, and arms 206. In certain embodiments, all aspects of robot training can be accomplished via controls built into the robot, eliminating any need for external training pendants or remote controls. The user interface and the robot's behavior may mimic human behavior to a large extent, allowing a user without a high level of technical expertise to quickly familiarize himself with the robot 200, interact with the robot via simple physical interaction (e.g., by guiding the robot's arm), and interpret and/or anticipate its actions based on intuitive visual, haptic, or other cues. In addition, the robot 200 may include a more traditional user interface with menus, text entry fields, etc., that provide information about and allow manipulation of the robot's state in a language familiar to the technically versed user.

In the embodiment illustrated, the robot has a screen 212 (e.g., an LCD screen) integrated into its head 204, which can rotate about a vertical axis and nod about a horizontal axis running parallel to the screen 212. The screen 212 sometimes displays a face, and sometimes text, menus, icons, spatial maps, and images from the robot's cameras, in various combinations.

The robot 200 includes five cameras. One camera is located in each of the two wrists 209 so that the robot 200 can "see" objects it is about to pick up and adjust its grippers 208 accordingly. Further, the robot has two cameras 218, side by side, in its chest to provide a wide-angle view of the workspace and allow the robot 200 to visually detect equipment or objects to be manipulated. Finally, the robot 200 has a camera 220 above the screen 212; the camera 220 is oriented outwards to detect people in the environment.

Figure 2:
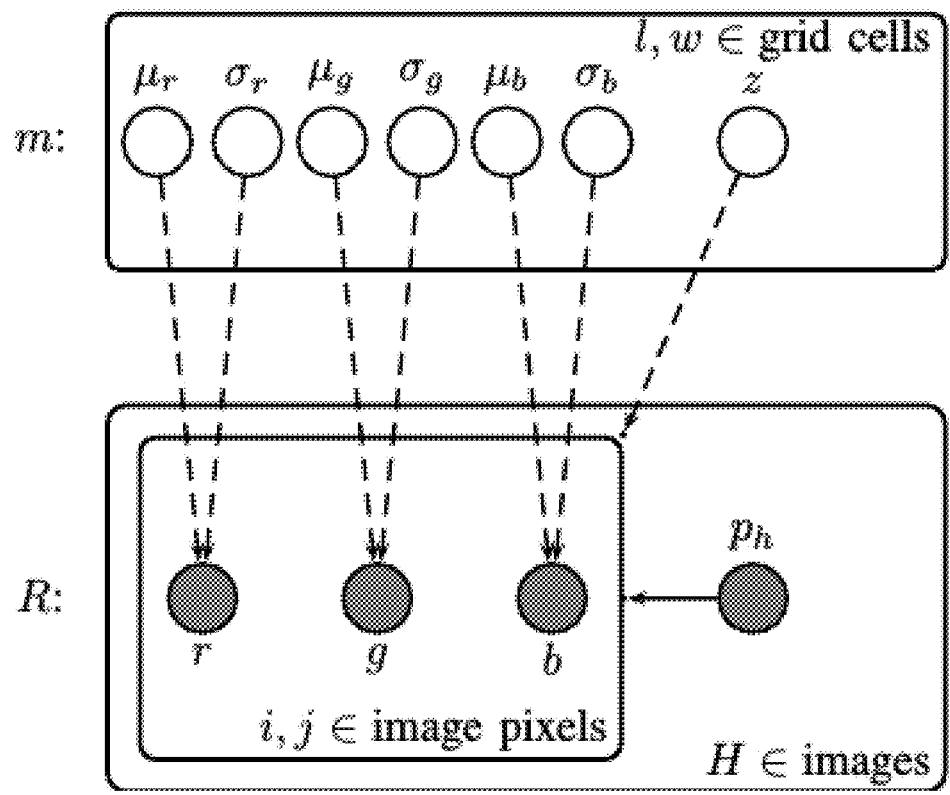
FIG. 2 illustrates a graphical model for the present invention.

The present invention provides a probabilistic model for light field photography using a calibrated eye-in-hand camera. FIG. 2 illustrates a graphical model for the present invention. Dashed lines indicate that those edges are only present for a subset of the variables, for the bundle of rays $R_{l,w}$ that correspond to a particular grid cell. Inference in this model corresponds to an inverse graphics algorithm that finds a 2.5D model of a scene using focus sweeps. An assumption is that a robot is observing the scene from multiple perspectives using a camera, receiving a sequence of images, $Z_0 \ldots Z_H$. The robot also receives a sequence of poses, $p_0 \ldots p_H$, containing camera position and orientation. The invention assumes access to a calibration function that defines a ray for each pixel in an image: $C(i, j, r_h, z) \rightarrow \{(x, y)\}$ which converts pixel i and j coordinates to an x and y in the robot's base coordinate system given a z along the ray, along with its inverse: $C^{-1}(z, y, p_h, z) \rightarrow \{(i,j)\}$.

Figure 3:
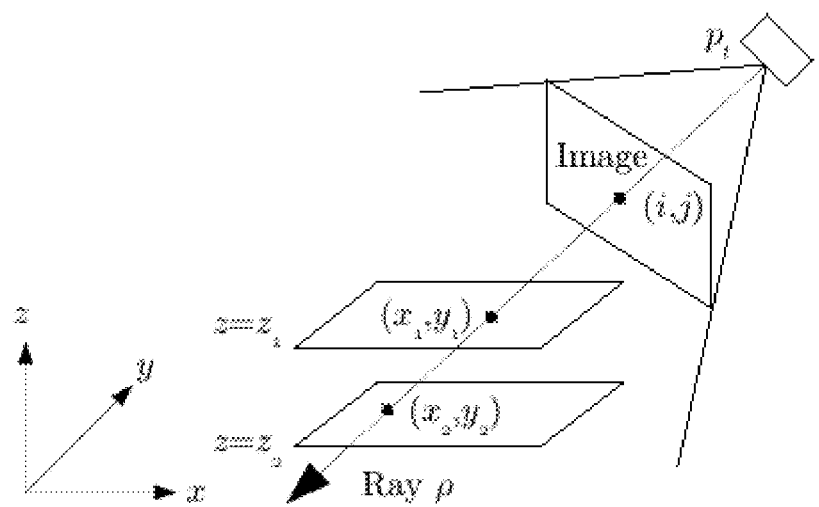
FIG. 3 illustrates a diagram of an exemplary scene captured by a camera.

This calibration function enables us to define a set of light rays, R, where each ray contains the direction and intensity information from each pixel of each calibrated image. Formally, each $p \in R$ consists of an intensity value, (r, g, b), as well as the pose of the image, $r_h$, and its pixel coordinate, (i, j). This information, combined with the calibration function, enables one to use the ray components to compute an (x, y) coordinate for any height z. FIG. 3 illustrates a diagram of an exemplary scene captured by a camera, wherein for $z=z_1$, ray $\rho \in R_{l1,w1}$; for $z=z_2$, ray $\rho \in R_{l2,w2}$.

Next, we define a distribution over the light rays emitted from a scene. Using this generative model, we can then perform inferences about the underlying scene, conditioned on observed light rays, R. We define map, m, as an L×W array of cells in a plane in space. Each cell (l, w)∈m has a height z and scatters light at its (x, y, z) location. For convenience, we write that the calibration function C can take either (x, y) coordinates in real space or (l, w) indexes into map cells. We assume each observed light ray arose from a particular cell (l, w), so that the parameters associated with each cell include its height z and a model of the intensity of light emitted from that cell. Formally, we wish to find a maximum likelihood estimate for m given the observed light rays R:

$$\operatorname*{argmax}_{m} P(R \mid m) \qquad (1)$$

We assume that each bundle of rays is conditionally independent given the cell parameters. This assumption is violated when a cell actively illuminates neighboring cells (e.g., a lit candle), but enables us to factor the distribution over cells:

$$P(R \mid m) = \prod_{l,w} P(R_{l,w} \mid m) \qquad (2)$$

Here $R_{l,w} \subset R$ denotes the bundle of rays that arose from map cell (l, w), which can be determined finding all rays that intersect the cell using the calibration function. Formally:

$$R_{l,w} \equiv \{\Sigma \in R \mid C(i,j,p_h,z)=(l,w)\} \qquad (3)$$

We assume each cell emits light on each channel as a Gaussian over (r, g, b) with mean $\mu_{l,w}$ ($\mu_r$, $\mu_g$, $\mu_b$) and variance $\sigma^2_{l,w}$ ($\sigma^2_r$, $\sigma^2_g$, $\sigma^2_b$):

$$P(R \mid m) = \prod_{l,w} P(R_{l,w} \mid \mu_{l,w}, \sigma^2_{l,w}, z_{l,w}). \qquad (4)$$

We rewrite the distribution over the bundle of rays, $R_{l,w}$, as a product over individual rays $\rho \in R_{l,w}$:

$$P(R_{l,w} \mid \mu_{l,w}, \sigma^2_{l,w}, z_{l,w}) = \prod_{\rho \in R_{l,w}} \prod_{c \in \{r,g,b\}} P(\rho_c \mid \mu_c, \sigma^2_c, z_{l,w}). \qquad (6)$$

As a Gaussian:

$$P(\rho_c | \mu_c, \sigma^2_c, z_{l,w}) = \mathcal{N}(\rho_c, \mu_c, \sigma^2_c). \quad (7)$$

Figure 4:
FIG. 4 shows an example room scene.
Figure 5:
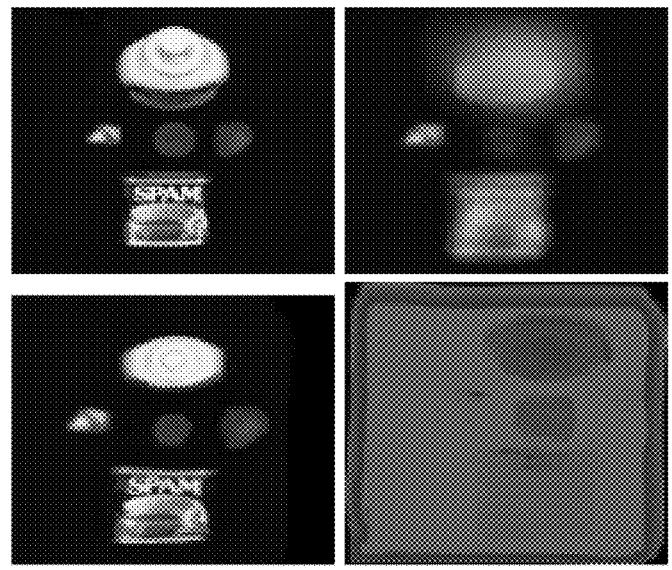
FIG. 5 shows an example table top scene.

We can render m as an image by showing the values for $\mu_{l,w}$ as the pixel color; however variance information $\sigma^2_{l,w}$ is also stored. FIG. 4 and FIG. 5 show example room and table top scenes, respectively, rendered using this model.

During inference, we estimate m at each height z using grid search. Most generally, each ray should be associated with exactly one cell; however this model requires a new factorization for each setting of z at inference time, as rays must be reassociated with cells when the height changes. In particular, the rays associated with one cell, $R_{l,w}$, might change due to the height of a neighboring cell, requiring a joint inference over all the heights, z. If a cell's neighbor is very tall, it may occlude rays from reaching it; if its neighbor is short, that occlusion will go away.

As an approximation, instead of labeling each ray with a cell, we optimize each cell separately, double counting rays and leading to some issues with occlusions. This approximation is substantially faster to compute because we can analytically compute $\mu_{l,w}$ and $\sigma^2_{l,w}$ for a particular z as the sample mean and variance of the rays at each cell.

EM approaches perform ray labeling so that each ray is assigned to a particular cell at inference time. This approximation works well for small distances because it overcounts each cell by approximate the same amount; we expect it to have more issues estimate depths at longer distances, such as that shown in FIG. 4.

FIG. 5 shows the depth estimate for a tabletop scene computed using this method. The images were taken with the camera 38 cm from the table. The top of the mustard is 18 cm from the camera and very shiny, so this degree of local estimation is non-trivial. The RGB map is composed from metrically calibrated images that give a top down view that appears in focus at every depth. Such a map greatly facilitates object detection, segmentation, and other image operations. Note that fine detail such as the letters on the SPAM is visible.

Once the robot has found an estimate, m for a scene, for example to create a background model, it might want to detect changes in the model after observing the scene again and detecting a ray, $\rho'$ at (l, w). At each cell, (l, w), we define a binary random variable $d_{l,w}$ that is false if the light for that cell arose from background model m, and true if it arose from some other light emitter. Then for each cell we want to estimate:

$$P(d_{l,w} | m, \rho') = P(d_{l,w} | \mu_{l,w}, \sigma_{l,w}^2, \rho') \quad (8)$$

We rewrite using Bayes' rule:

$$= \frac{P(\rho' | d_{l,w}, \mu_{l,w}, \sigma^2_{l,w}) \times P(d_{l,w} | \mu_{l,w}, \sigma^2_{l,w})}{P(\rho' | \mu_{l,w}, \sigma^2_{l,w})} \quad (9)$$

We use the joint in the denominator:

$$= \frac{P(\rho' | d_{l,w}, \mu_{l,w}, \sigma^2_{l,w}) \times P(d_{l,\omega} | \mu_{l,w}, \sigma^2_{l,w})}{\sum_{d_{l,w} \in \{0,1\}} P(\rho' | d_{l,w}, \mu_{l,w}, \sigma^2_{l,w}) \times P(d_{l,w} | \mu_{l,w}, \sigma^2_{l,w})} \quad (10)$$

We initially tried a Naive Bayes model, where we assume each color channel is conditionally independent given $d_{l,w}$:

$$= \frac{\prod_{c \in \{r,g,b\}} P(\rho'_c | d_{l,w}, \mu_c, \sigma^2_c) \times P(d_{l,w} | \mu_c, \sigma^2_c)}{\sum_{d_{l,w} \in \{0,1\}} \prod_{c \in \{r,g,b\}} P(\rho'_c | d_{l,w}, \mu_c, \sigma^2_c) \times P(d_{l,w} | \mu_c, \sigma^2_c)} \quad (11)$$

If $d_{l,w}$ is false, we use $P(\rho_c | d_{l,w}=0, \mu_c, \sigma^2_c)=1/255$; otherwise we use the value from Equation 7. We only use one ray, which is the mean of $\mu_0$ of the rays in $R_0$. We use a uniform prior so that $P(d_{l,w} | \mu_c, \sigma^2_c)=0.5$. However this model assumes each color channel is independent and tends to under-estimate the probabilities, as it is with Naive Bayes. In particular, this model tends to ignore discrepancy in any single channel, instead requiring at least two channels to be substantially different before triggering.

For a more sensitive test, we use a Noisy Or model. First we define variables for each channel, $d_{l,w}$, where each variable is a binary indicator based on the single channel c. We rewrite our distribution as a marginal over these indicator variables:

$$P(d_{l,w} | m, \rho') = \sum_{d_{l,w,r}} \sum_{d_{l,w,g}} \sum_{d_{l,w,b}} P(d_{l,w} | d_{l,w,r}, d_{l,w,g}, d_{l,w,b}) \times P(d_{l,w,r}, d_{l,w,g}, d_{l,w,b} | m, \rho').$$

We use a Noisy Or model for the inner term:

$$P(d_{l,w} | d_{l,w,r}, d_{l,w,g}, d_{l,w,b}, m, \rho') = 1 - \prod_{c \in \{r,g,b\}} [1 - P(d_{l,w} | d_{l,w,c}=1 \wedge d_{l,w,c' \neq c}=0, m, \rho')]^{d_{l,w,c}} \quad (12)$$

We define the inner term as the single channel estimator $$P(d_{l,w}=1 | d_{l,w,c}=1 \wedge d_{l,w,c' \neq c}=0, m, \rho') = P(d_{l,w,c} | m, \rho') \quad (13)$$

We define it with an analogous version of the model from Equation 11 with only one channel:

$$\frac{P(\rho'_c | d_{l,w,c}, \mu_c, \sigma^2_c) \times P(d_{l,w,c} | \mu_c, \sigma^2_c)}{\sum_{d_{l,w} \in \{0,1\}} P(\rho'_c | d_{l,w}, \mu_c, \sigma^2_c) \times P(d_{l,w} | \mu_c, \sigma^2_c)} \quad (14)$$

Figure 6:
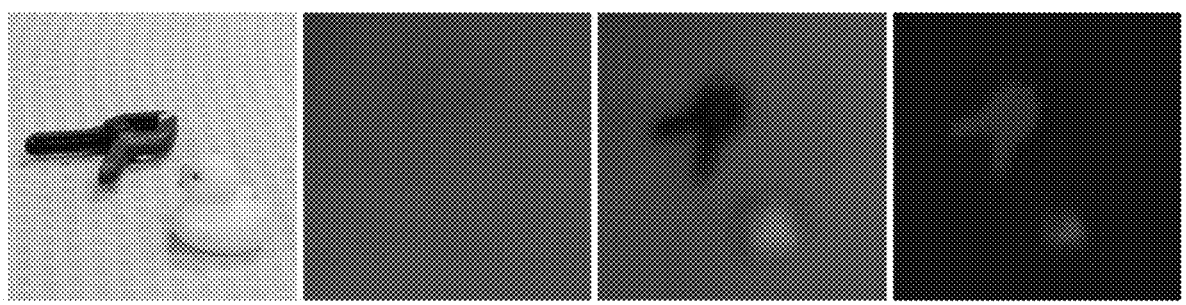
FIG. 6 shows a scene rendered with no objects, and after two objects have been added.

FIG. 6 shows a scene rendered with no objects, and after two objects have been added. Note the accurate segmentation of the scene obtained by the robot's ability to move objects into the scene and compare the information using an orthographic projection.

In order to accurately focus rays in software, we must be able to determine the path of a ray of light corresponding a pixel in a camera image given the camera pose for that image, $r_I$, and the pixel coordinate generating that ray, (i, j). We define a calibration function of the form $C(i, j, r_I, z) \rightarrow \{(x, y)\}$. To perform calibration, we first define a model for mapping between pixel coordinates and world coordinates. Then we find maximum likelihood model parameters using Equation 4.

We build a 4×4 matrix S which encodes the affine transformation from pixel coordinates to physical coordinates for an origin centered camera. To complete the eye in hand, we compose it with the 4×4 matrix T representing the end effector transformation, obtained by forward kinematics over the joint angles supplied by the encoders.

We use ($x^p$, $y^p$) to denote the pixel coordinate (i=$y^p$, j=$x^p$), to simplify the notation of the matrix math. Suppose the image is w pixels wide and h pixels tall so that a=($x^p$, $y^p$, 1, 1) is a pixel in the image located at row y and column x, x can span from 0 to w−1, and y can span from 0 to h−1. We specify $x^p$ and y as integer pixels, assign a constant value of 1 to the z coordinate, and augment with a fourth dimension so we can apply full affine transformations with translations. Assume that the principle point of the image is $c_p$=($c_{px}$, $c_{py}$)=(w/2, h/2). That is to say, the aperture of the camera is modeled as being at the origin of the physical coordinate frame, facing the positive z half space, collecting light that travels from that half space towards the negative z half space, and the z axis intersects c. In the pinhole model, only light which passes through the origin is collected, and in a real camera some finite aperture width is used. The camera in our experiments has a wide depth of field and can be modeled as a pinhole camera. We define a matrix T to correspond to the affine transform from $r_l$ to the coordinate system centered on the camera, and $S_z$ to correspond to the camera parameters. If we want to determine points that a ray passes through, we must specify the point on the ray we are interested in, and we do so by designating a query plane parallel to the xy-axis by its z coordinate. We can then define the calibration function as a matrix operation:

$$TS_z \begin{bmatrix} (x^p - c_{px}) \\ (y^p - c_{py}) \\ 1 \\ 1 \end{bmatrix} = \begin{bmatrix} x \\ y \\ 1 \\ 1 \end{bmatrix} \quad (15)$$

We chose to model magnifications separately in x and y to compensate for the wide angle lens on the robot. To determine the constants that describe pixel width and height in meters, we obtained the relative pose of the stock wrist camera from the factory measurements. Here $M_x$ and $M_y$ are the camera magnification parameters:

$$S_z = \begin{bmatrix} M_x \cdot z & 0 & 0 & 0 \\ 0 & M_y \cdot z & 0 & 0 \\ 0 & 0 & z & 0 \\ 0 & 0 & 0 & 1 \end{bmatrix}. \quad (16)$$

We model radial distortion in the typical way by making $S_z$ a function not only of z but also quadratic in ($x^p - c_{px}$) and ($y^p - c_p$).

Calibrating the camera involves finding the magnification terms $M_x$ and $M_y$ (though the principle points and the radial quadratic terms can be found by the same means). To find the magnification coefficients, we set a printed paper calibration target on a table of known height in front of Baxter. We collect camera images from a known distance above the table and estimate the model for the collected rays, forming a synthetic image of the calibration target. The values for $M_x$ and $M_y$ which maximize the likelihood of the observed rays under the estimated model in Equation 4 are the values which yield the correct pixel to global transform, which incidentally are also the values which form the sharpest synthetic image. We find $M_x$ and $M_y$ with grid search. Determining such parameters by iteratively rendering is a form of bundle adjustment, and also allows us to perform 3D reconstruction. It is repeatable and precise, and the cameras are consistent enough that we can provide a default calibration that works across different robots.

Overhead lights induce specular highlights and well formed images on shiny surfaces, as well as broader and more diffuse pseudo-images on textured or wet surfaces. Vision algorithms are easily confused by the highly variable appearance of reflections, which can change locations on the surfaces of objects as relative positions of lighting sources change. We can use information contained in the light field to remove some of the reflections in an estimated map, as long as affected portions were seen without reflections from some angles.

Specular reflections of the surface of an object tend to form virtual images which are in focus behind the object. When a human looks at a shiny object or the surface of still water, they might first focus on a specular reflection formed by the object, realize it is bright and therefore not the true surface, and then look for a different color while focusing closer. To construct a map with reduced reflections, we perform a focus sweep to identify rays that are part of the object, in focus at one depth, and separately, rays part of a highlight, in focus at a different (deeper) depth. Specifically, we first estimate z values for the map by approximate maximum likelihood. Then, we re-estimate the z values by re-rendering at all heights while throwing out rays that are too similar to the first map and only considering heights which are closer to the observer than the original estimate. That is, the second estimate looks to form a different image that is closer to the observer than the first. The final image is formed by taking either the first or second value for each cell, whichever has the smallest variance, which is a measure of the average likelihood of the data considered by that cell. If the second estimate considered too few samples, we discard it and choose the first. FIG. 4 shows an example image from Baxter's wrist camera showing highly reflective objects, and the same scene with reflections suppressed.

Identifying reflections using optical cues instead of colors allows us to remove spots and streaks of multiple light sources in a previously unencountered scene without destroying brightly colored Lambertian objects. The requirement that the second image form closer than the first dramatically reduces artifacts, but when considering z values over a large range, some image translocation can occur, causing portions of tall objects to bleed into shorter ones. On the whole, though, when considering objects of similar height, this algorithm suppresses reflections substantially without admitting many false positives. Especially on sharply curved objects there will sometimes be a region that was covered by a reflection from all angles. If such a reflection occurs near a boundary it may aid in localizing the object. If it occurs on the inside of an object region, it will often be surrounded by a region of suppressed reflections, which are detected by the algorithm. Concave reflective regions can form reflections that are impossible to remove with this algorithm since they form complex distorted images which can project in front of the object. A notable instance of this is the metal bowl in our example.

Synthetic photography allows us to create composite images which are more amenable to inference than their contributing source images due to novel viewing angles, perspectives, lighting conditions, and software lens corrections. By forming orthographic projections we can use sliding window detectors to reliably localized Lambertian objects, and our reflection suppression technique lets us cut through most specular highlight found on household goods. Many vision tasks could be made easier through the use of synthesized images; however, we wanted to demonstrate a task which would usually be considered difficult to perform through individual RGB camera images or with an IR depth sensor, but is rendered nearly trivial by synthetic photography: picking a metal fork from running water.

Figure 7A:
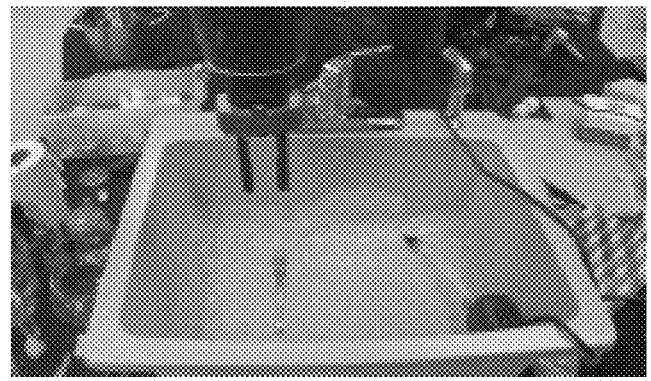
FIGS. 7A, 7B, 7C and 7D illustrate different images.

We filled a sink with several inches of water and used a pump to induce an appreciable current. The current maintained turbulence across the water surface, which generated a substantial number of shadows and reflections in the moving water and surrounding surfaces, shown in FIG. 7A. Next we placed a metal fork in the sink under the flowing water. We used synthetic photographs focused at the bottom of the sink to successfully localize and pick the fork 24 times out of 25 attempts with Baxter's 4 cm gripper. There were no 180 degree confusions, and the single miss was pinched but not lifted.

Figure 7B:
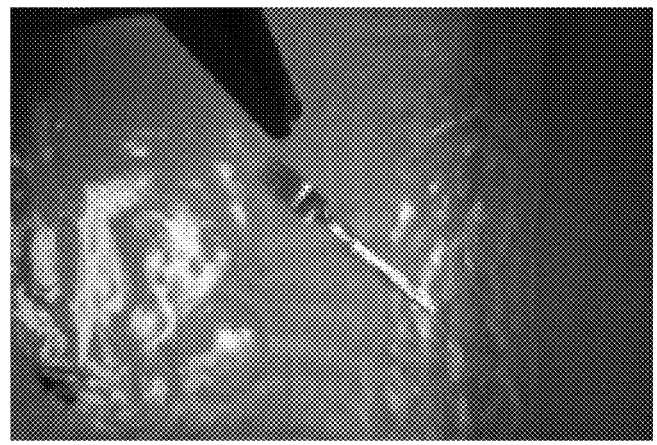

FIG. 7B illustrates a wrist camera view of a fork under flowing water.

Figure 7C:
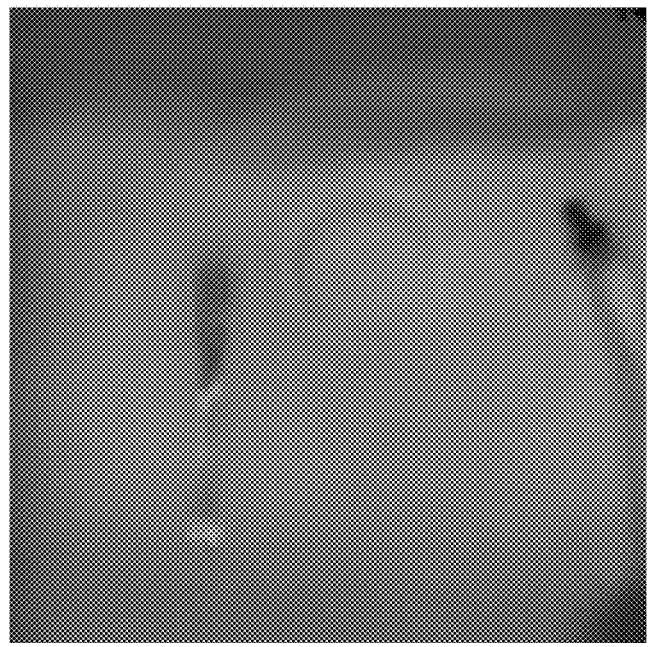

FIG. 7C illustrates a rendered orthographic image of the fork; reflections from water and metal are gone.

Figure 7D:

FIG. 7D illustrates a iscrepancy view, showing the robot can accurately segment the fork from the background.

The constant presence of reflections and shadows make it challenging to pick the fork from beneath the water based on individual images. Bright edges are present at all scales, so gradient based methods will have trouble, and the average intensity of the fork is similar to the average intensity of turbulent water, so blurring the scene will significantly degrade the signal. A stronger signal of the bottom of the sink may be obtained by leaving the camera still and averaging incoming images. This may eliminate reflections and shadows, but it only provides one perspective of the fork, which is prone to noise due to fixed reflections. By synthesizing images which are focused at the bottom of the sink, we get the benefits of averaging images from a still camera combined with the robustness of multiple perspectives. Neither water nor metal is particularly conducive to imaging with IR depth cameras, making it harder to solve this problem with such sensors.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A robot comprising:
   a gripping member configured to move and pick up an object;
   a camera affixed to the gripping member such that movement of the gripping member causes movement of the camera, the camera configured to measure and store data related to intensity of light and direction of light rays within the environment;
   an image processing module configured to process the data to generate a probabilistic model defining a location of the object within an environment; and
   an operation module configured to move the gripping member to the location and pick up the object.

2. The robot of claim 1 wherein the probabilistic model turns a calibrated eye-in-hand camera into a time-lapse light field camera that can be used for robotic perception.

3. The robot of claim 2 wherein robotic perception comprises observing a scene from multiple perspectives, receiving a sequence of images and a sequence of poses containing camera position and orientation.

4. A method for picking up an object within an environment using a robot comprising:
   moving a camera between a plurality of locations, each location generating a different viewing angle between the camera and the object;
   measuring data, with respect to the object and the environment, showing intensity of light and direction of light rays in the environment at each location;
   processing the data to determine a most likely location of the object; and
   operating a gripper on the robot by moving the gripper to the most likely location and picking up the object with the gripper.

5. The method of claim 4 wherein the step of moving the camera is accomplished by attaching the camera to a mobile member of the robot and moving the mobile member.

6. The method of claim 4 wherein the gripper is attached to the mobile member.

7. The method of claim 4 wherein the step of processing the data to determine a most likely location of the object includes generating a probabilistic model.

8. The method of claim 4 wherein the robot is a modified Baxter robot capable of carrying out the other steps of the method.

9. The method of claim 4 further comprising the step of focusing the camera based on a plurality of known objects within the environment, each known object being located at a known distance from at least one of the locations.

10. The method of claim 4 further comprising the step of identifying reflections using optical cues and modifying the data according to the reflections.

11. The method of claim 4 further comprising the step of calibrating the camera based on a depth associated with the object.

12. The method of claim 4 wherein the object is a non-Lambertian object.

13. The method of claim 4 wherein the environment is a non-Lambertian environment.

* * * * *